United States Patent [19]

Park

[11] Patent Number: 5,761,276
[45] Date of Patent: Jun. 2, 1998

[54] VOICE MAIL SERVICE APPARATUS AND A CONTROLLING METHOD THEREOF

[75] Inventor: Soon-Bo Park, Daegu, Rep. of Korea

[73] Assignee: SamSung Electronics Co., Ltd., Suwon, Rep. of Korea

[21] Appl. No.: 655,127

[22] Filed: May 28, 1996

[30] Foreign Application Priority Data

May 27, 1995 [KR] Rep. of Korea ............... 1995-13577

[51] Int. Cl.$^6$ ............................................. H04M 3/50
[52] U.S. Cl. ............................................. 379/89; 379/84
[58] Field of Search ............................... 379/89, 88, 67, 379/84

[56] References Cited

U.S. PATENT DOCUMENTS

| | | | |
|---|---|---|---|
| 4,307,454 | 12/1981 | Haben et al. | 379/89 X |
| 5,003,575 | 3/1991 | Chamberlin et al. | 379/89 |
| 5,181,238 | 1/1993 | Medamana et al. | 379/95 |
| 5,345,497 | 9/1994 | Amoroso et al. | 379/33 |
| 5,349,636 | 9/1994 | Irribarren | 379/89 |
| 5,425,078 | 6/1995 | Stern | 379/67 |
| 5,450,475 | 9/1995 | Miyagaki | 379/67 |
| 5,454,030 | 9/1995 | De Oliveira et al. | 379/100 |
| 5,483,580 | 1/1996 | Brandman et al. | 379/88 |
| 5,493,607 | 2/1996 | Arumainayagam et al. | 379/88 |
| 5,581,601 | 12/1996 | Abramowski et al. | 379/67 |

*Primary Examiner*—Thomas W. Brown
*Attorney, Agent, or Firm*—Robert E. Bushnell, Esq.

[57] ABSTRACT

A voice mail service apparatus directly registering mail numbers received from service users as a technique for designating the mail number of the service user facilitates accommodation of a larger number of service subscribers. This voice mail service uses a telephone exchange station for analyzing a concerned mail number and performing a call connection, when a voice mailing service is requested; a mail gateway for verifying the mail number which is analyzed in the telephone exchange station; a call distributor for analyzing a digit of the mail number which is verified in the mail gateway and inputted thereto, in order to sequentially distribute a call to a plurality of voice mailing units; and a server for checking whether the mail number is newly registered, in order to transmit registered information to the plurality of voice mailing units, the server being connected to the plurality of voice mailing units.

10 Claims, 5 Drawing Sheets

VOICE MAIL SERVICE APPARATUS AND A CONTROLLING METHOD THEREOF

CROSS REFERENCE TO RELATED APPLICATIONS

This application makes reference to, incorporates the same herein, and claims all benefits accruing under 35 U.S.C. §119 from a patent application entitled A VOICE MAIL SERVICE APPARATUS AND A CONTROLLING METHOD THEREOF earlier filed in the Korean Industrial Property Office, on the 27th day of May 1995 and there duly assigned Ser. No. 13577/1995.

BACKGROUND OF THE INVENTION

1. Field of the Invention

The present invention relates to a voice mail service apparatus, and more particularly, to a voice mail service apparatus and processes for controlling a voice mail apparatus accommodating direct registration of a mail number by a service user of the system.

2. Description of the Related Art

Generally, in a contemporary voice mail system such as that represented by the Method For Controlling Electronic Telephone Switches by Tsutomu Miyagaki, U.S. Pat. No. 5,450,475, and the Methods And Apparatus For Non-Simultaneous Transmittal And Storage Of Voice Message And Digital Text Or Image, by Y. Brandman, et al., U.S. Pat. No. 5,483,580, when a service user applies for admission to a system operator, the system operator inputs data corresponding to a new mail number for the service user in a database of the operational system, to thereby establish a mail number allocated by the system operator to the service user. At this time, voice mailing service for the service user is performed. In this case, even though so many service users are admitted to the mail gateway of the voice mail service apparatus, data corresponding to the new mail number of the service user is typically managed in the mail gateway, as shown for example, by the use of translation tables to identify the domains of input addresses in the Multi-System Network Addressing of A. T. Arumainayagam, et al., U.S. Pat. No. 5,493,607, in order to provide the service user with voice mailing service.

Typically, in a conventional technique for controlling the voice mailing service apparatus, the mail number is allocated by the mail gateway and data corresponding to the mail number, that is, the voice mailing unit number and an identifier known as a voice mail system identifier or simply as a VMS identifier, is managed in the mail gateway such, by way of an illustrative example, the Voice Gateway System of Centigram Communications Corporation as taught by such examplars as R. Irribarren in Interface System And Method For Interconnecting A Voice Message System And An Interactive Voice Response System, U.S. Pat. No. 5,349,636, so that the subscriber is connected to the voice mailing unit associated with the mail number when the service user requests the voice mailing service. I have discovered that due to limitations on subscriber holding by the voice mailing units, the physical connection between the voice mailing units is insufficient to identify the mail number, and also that there is no data linkage function available in order to provide many subscribers with the voice mailing service as well as to make it possible for a service user to become registered with a desired mail number in direct association with the voice mailing unit. In a frequent contemporary variation of the conventional technique, additional voice mailing units are used in the apparatus; however, the presence of the additional voice mailing units is responsible for too long of a time delay caused by the mail number identifying procedure of the voice mailing service. Other recent efforts, such as the Network Of Voice And/Or FAXMail Systems by J. A. F. de Oliveria, et al., U.S. Pat. No. 5,454,030, which depend upon enhancement of the capacity of a network with a fiber optics ring system and supplementation of the voice mailing units with bulk storage units, is not particularly cost effective for smaller installations.

Moreover, the mail gateway can not manage the mail numbers throughout the entire technique for controlling the mail service apparatus and must await completion of the process by the voice mailing unit. After identification has been completed, the call connection between the service subscriber and the voice mailing unit should be controlled; because the call connection between the service subscriber and the voice mailing unit is not controlled again after completion of the identification however, the voice mailing service function requested by the service subscriber is not particularly uniform in its operation. Furthermore, I noticed that operation of the system is unduly complex because the information concerned with the service subscriber, which is necessary to implement the voice mailing service, is all too frequently registered only in the voice mailing units.

SUMMARY OF THE INVENTION

It is therefore an object of the present invention to provide an improved apparatus and processes for controlling voice mail service.

It is another object to provide an apparatus and processes for controlling voice mail service by directly registering a mail number received from a service user.

It is still another object to provide an apparatus and processes for controlling voice mail service by designating the mail number of the service user.

It is yet another object to provide an apparatus and processes for accommodating many service subscribers.

It is still yet another object to provide an apparatus and process for controlling a voice mail service to accommodating an increased number of service subscribers by directly registering mail numbers for service users as a manner of designating the mail number of the service user.

To achieve these and other objects, the present invention provides processes and apparatus for voice mail service using a telephone exchange station for analyzing mail numbers and performing call connections when voice mailing service is requested. A mail gateway is provided for verifying mail numbers analyzed by the telephone exchange station, and a call distributor analyzes digits of mail numbers verified by the mail gateway in order to sequentially distribute calls to a plurality of voice mailing units. A server connected to the plurality of voice mailing units checks whether the mail number is newly registered, and transmits registered information to the plurality of voice mailing units.

BRIEF DESCRIPTION OF THE DRAWINGS

A more complete appreciation of this invention, and many of the attendant advantages thereof will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
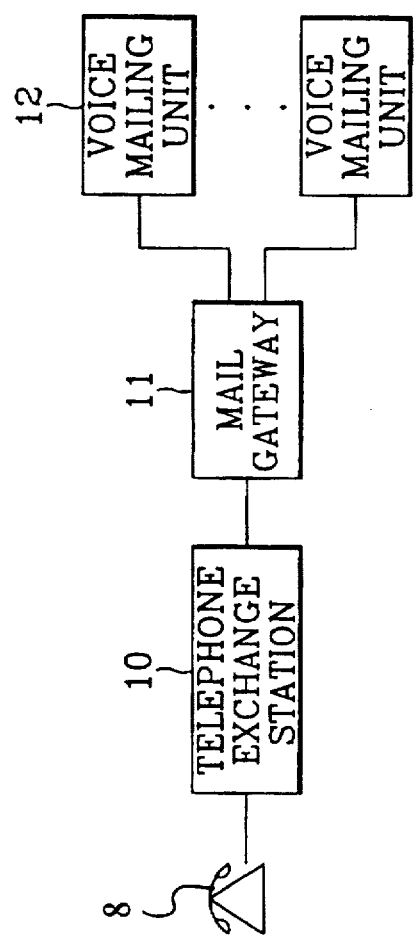
FIG. 1 is a block diagram illustrating the salient features of a simplified, hypothetical conventional operational system for a voice mail service apparatus configured to provide a voice mailing service.

Turning now to the drawings, FIG. 1 is a simplified block diagram illustrating a hypothetical conventional operational system for providing a primitive type of voice mail service. When a subscriber inputs the mail number via a telephone deskset 8 to use the voice mailing service, a general telephone exchange station 10 analyzes that mail number and then routes a call for the mail number analyzed to mail gateway 11. Mail gateway 11 then analyzes and verifies the mail number. After the verification of the mail number is completed, mail gateway 11 extracts data corresponding to the mail number from the operational system to perform a call connection with voice mailing unit 12 associated with the corresponding mail number. Voice mailing unit 12 is thereby connected with the subscriber to provide the subscriber with the voice mailing service.

As discussed above, typical conventional techniques for controlling the voice mailing service apparatus have the mail number allocated by mail gateway 11 and have data corresponding to the mail number, that is, the voice mailing unit number and an identifier, managed in mail gateway 11, so that the subscriber is connected to the one of a plurality of voice mailing units 12 associated with the mail number when voice mailing service is requested.

Figure 2:
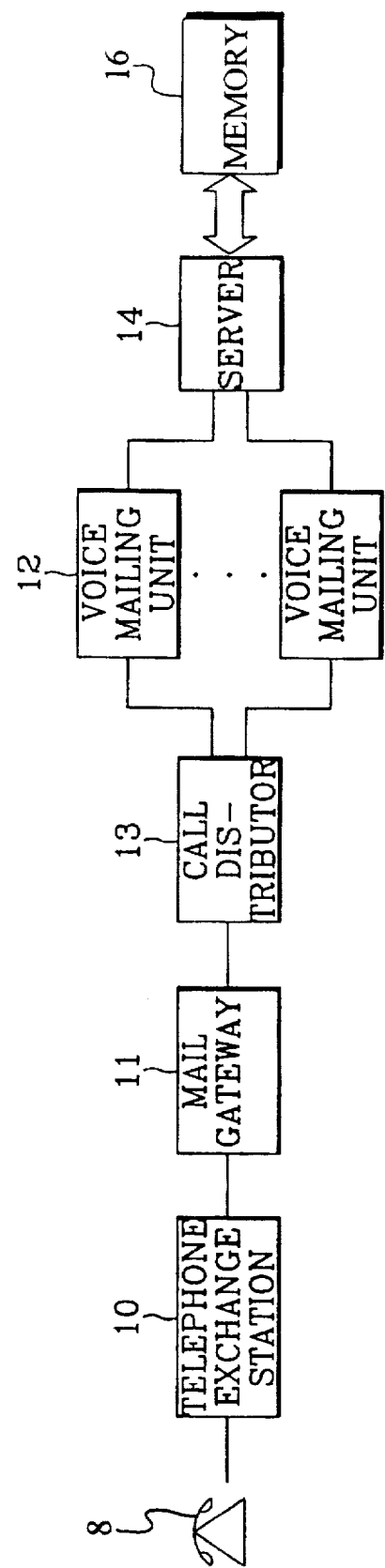
FIG. 2 is a block diagram illustrating an operational system of a voice mail service apparatus for providing a voice mailing service according to the principles of the present invention.

FIG. 2 is a block diagram illustrating an operational system of a voice mail apparatus for providing a voice mailing service according to the principles of the present invention. When voice mailing service is requested, a telephone exchange station 10 analyzes the corresponding mail number to establish a call connection. Mail gateway 11 verifies the mail number analyzed in the telephone exchange station 10. Call distributor 13 analyzes one or more digits of the mail number that has been verified by mail gateway 11 in order to sequentially distribute respective incoming calls to the indicated corresponding ones of a plurality of voice mailing units 12. Server 14 is separately connected to each of the plurality of voice mailing units 12. Server 14 checks a database maintained within memory 16 to determine whether the registration of the mail number is a new registration, and transmits the registration information read from the database to corresponding units of voice mailing units 12.

Figure 3:
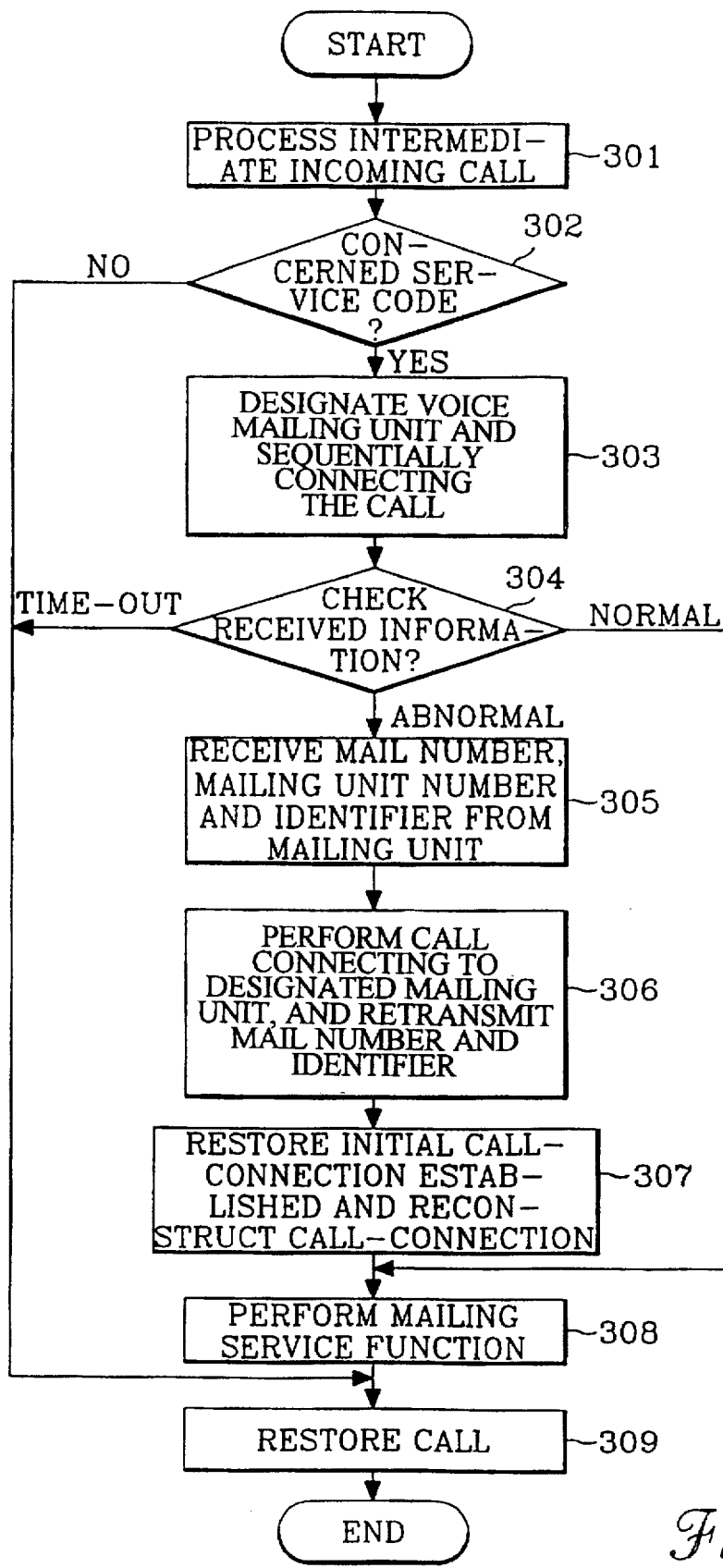
FIG. 3 is a flow chart illustrating a process for controlling a call distributor according to the principles of the present invention.

FIG. 3 is a flow chart illustrating one process for controlling the call distributor according to the principles of the present invention. Control of call distributor 13, as shown in FIG. 3, contemplates processing an intermediate call and verify a service code, which should be done when the voice mailing service is requested from mail gateway 11. One of voice mailing units 12 which can be next sequentially utilized is designated, and a service call is connected to the designated one of the plurality of voice mailing units 12. The service call is reconstructed according to the response received from the designated one of the voice mailing units 12.

Figure 4A:
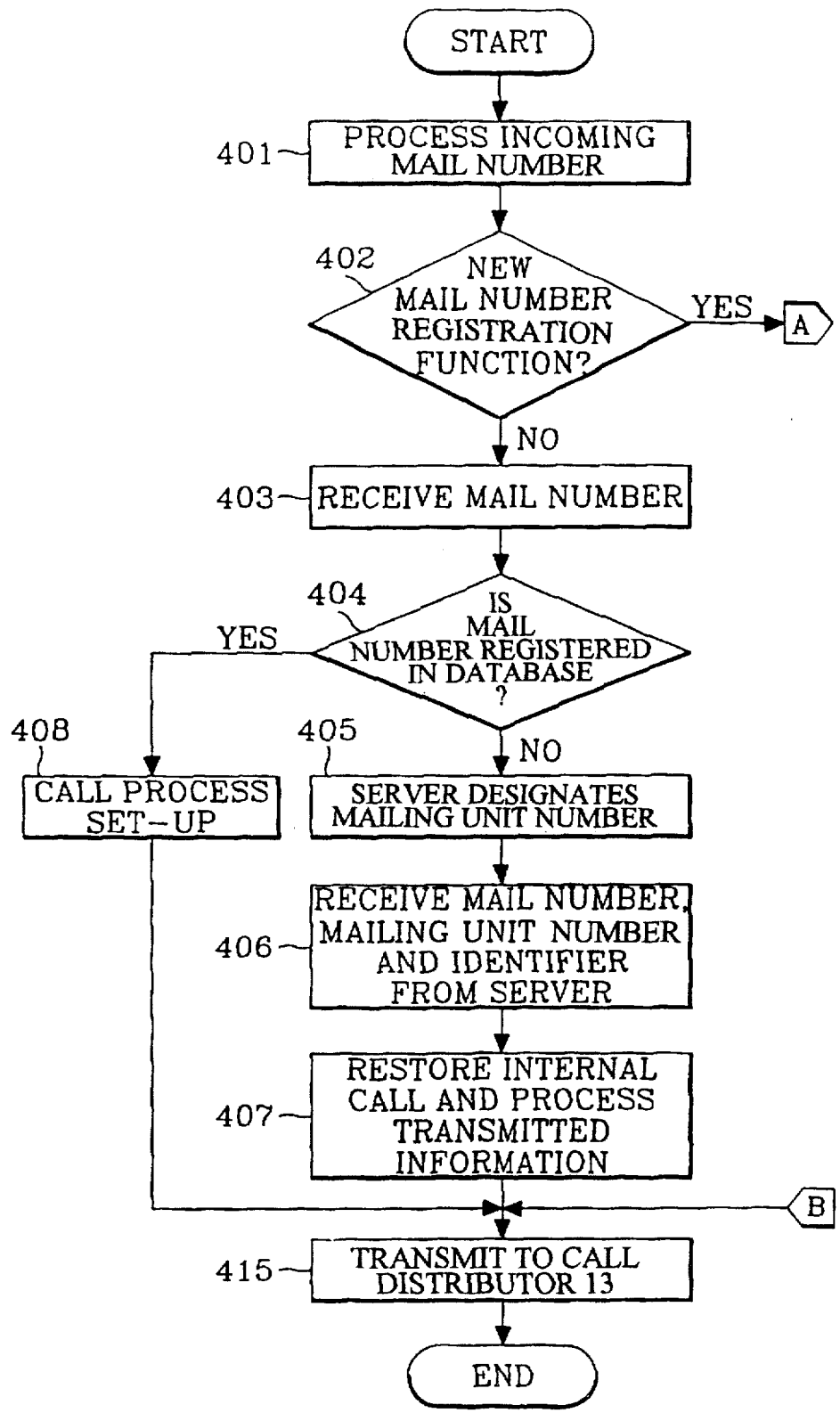
FIGS. 4A and 4B show a flow chart illustrating a process for controlling a voice mailing unit according to the principles of the present invention.
Figure 4B:
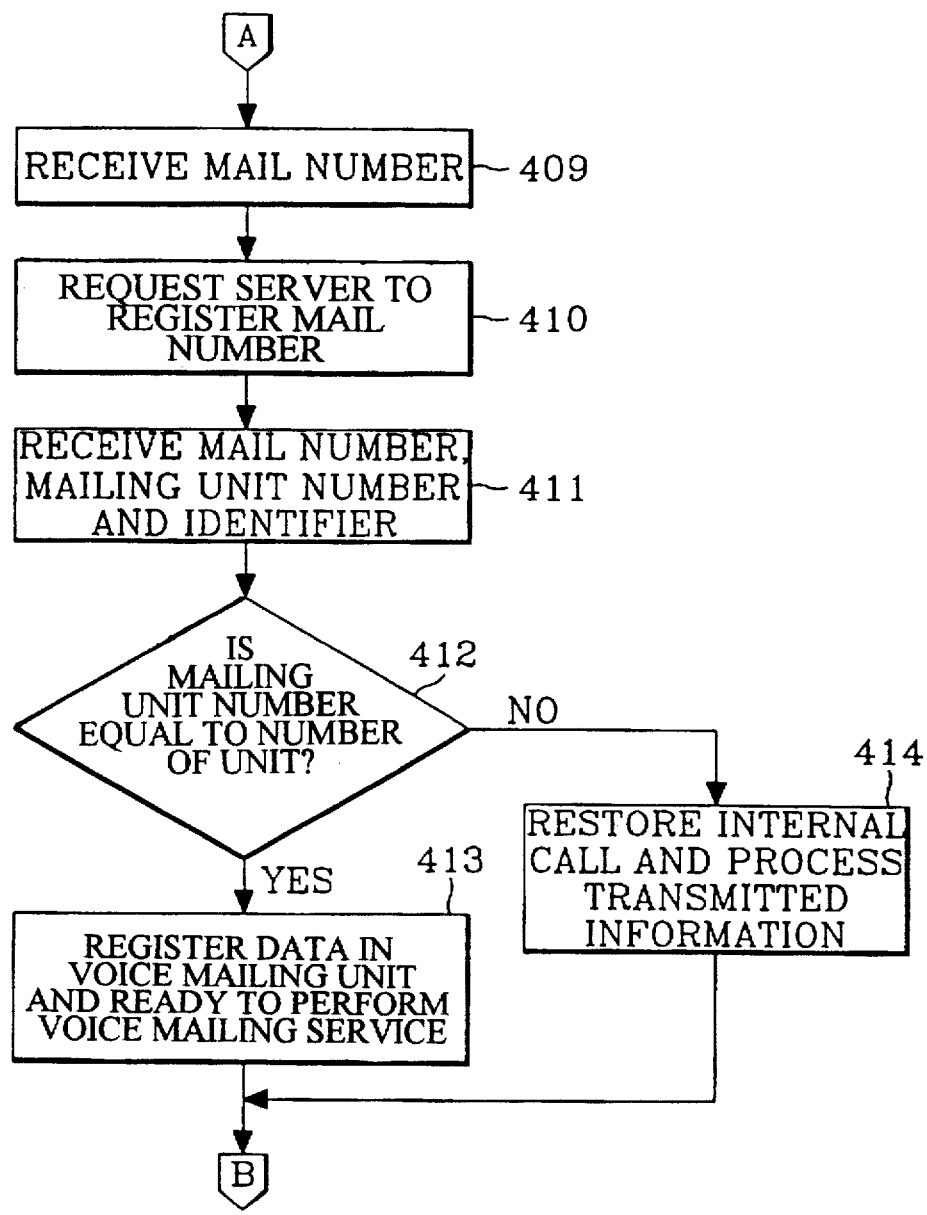

FIGS. 4A and 4B show a flow chart illustrating one process for controlling the voice mailing unit 12 according to the principles of the present invention. In this process, a check is made as to whether the registration of the mail is a the new registration when the service call is received A new mail number is registered to the voice mailing unit 12 whenever the registration of the mail number is a new registration. Conversely, the service call is processed for an existing registered numbers when previously registered.

Figure 5:
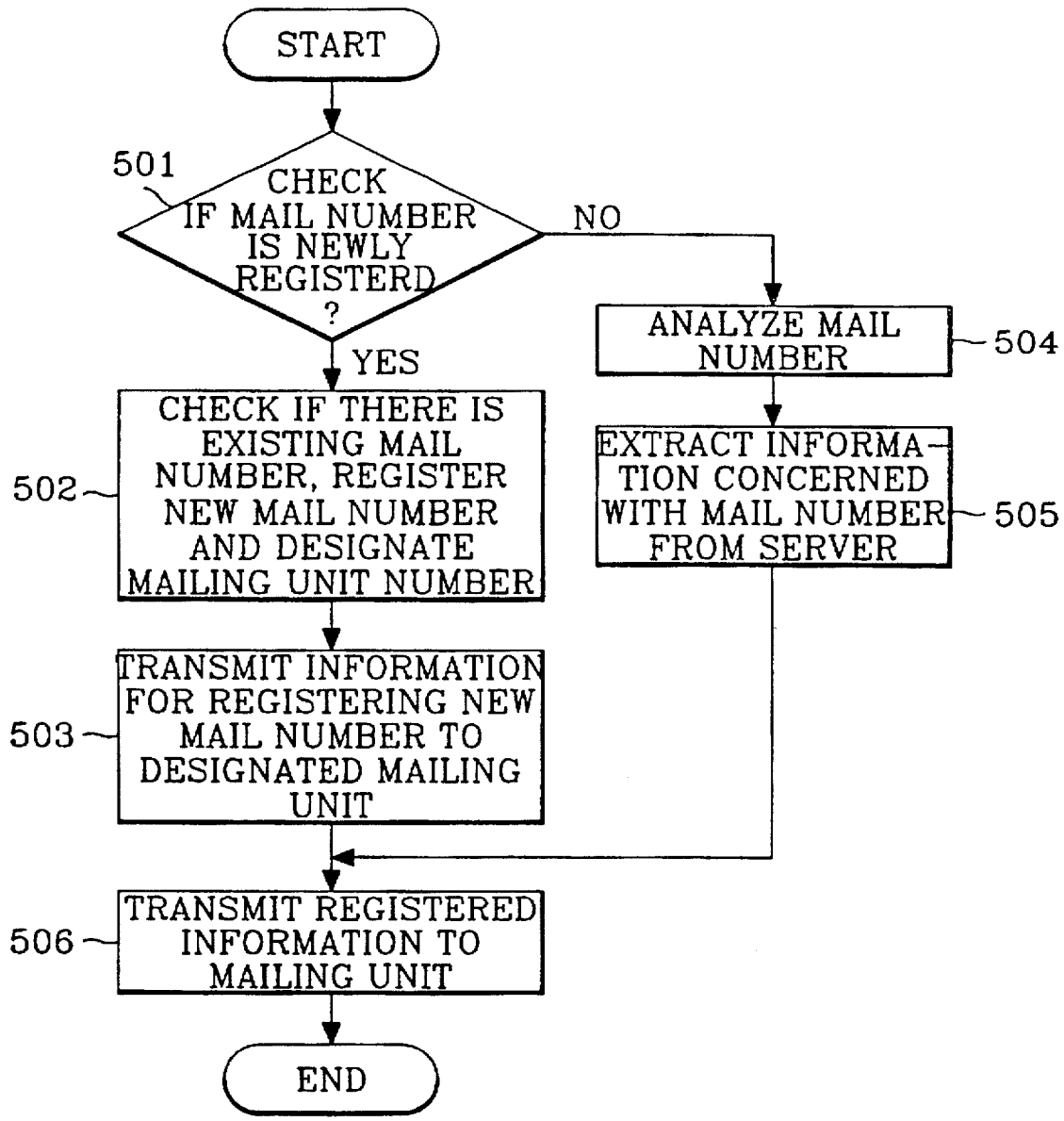
FIG. 5 is a flow chart illustrating a process for controlling a server according to the principles of the present invention.

FIG. 5 is a flow chart illustrating one process for controlling server 14 according to the principles of the present invention. Control of server 14 as shown in FIG. 5 requires registration of the new mail number within the database of server 14 and designating the one of the plurality of voice mailing units 12 for the existing registered mail number.

Referring now collectively to FIGS. 2 through 5, one detailed embodiment configured according to the principles of the present invention will be described in the following paragraphs. If the service subscriber inputs a service code through a telephone deskset 8, routing of the input service code to the call distributor 13 is achieved, thereby to process an intermediate incoming call in step 301. If the process of the intermediate incoming call is completed, call distributor 13 analyzes one or more digits of the service code to check in step 302 whether the service code is a concerned service code requesting the voice mailing service. At this time, in the case that the service code is not a concerned service code, the call is recovered in step 309. If the service code is the concerned service code, call distributor 13 checks data, in order to make a call connection to voice mailing unit 12 sequentially established in steps 303 and 401. If the call connection is achieved, voice mailing unit 12 inputs a service content in the form of a conversation with the service subscriber, thereby to decide whether to register the new mail number or, depending upon the service code to perform other functions in step 402.

If step 402 determines that the service code requires registration of the mail number, voice mailing unit 12 receives the mail number from call distributor 13 in step 409. When the mail number is received from the service subscriber, registration of that mail number is requested from server 14 in step 410. At this time, server 14 checks whether the registration of the mail number is a new registration in step 501. In the case that the registration of the mail number is a new registration, a check against an internal database within memory 16 by server 14 determines whether the concerned mail number has already been registered. In the case that the mail number received from the voice mailing unit 12 is not a previously registered mail number, server 14 registers the mail number within the database written within memory 16 and designates one of the voice mailing units corresponding to the new mail number in step 502. After the registration of the mail number is completed as discussed above, server 14 transmits information for registering the new mail number to the designated voice mailing unit 12 in step 503. Also, server 14 transmits registration information for the mail number, the voice mailing unit number and the identifier to the designated voice mailing unit 12 in step 506.

The designated voice mailing unit 12 checks whether the voice mailing unit number of transmitted information is consistent with the number of the designated one of the voice mailing units 12 in step 412. If the voice mailing unit number is not consistent with the number of the voice mailing unit 12, information corresponding to the received mail number, voice mailing unit number and identifier are transmitted to call distributor 13, the internal call which has already been processed is recovered and re-established, and information to be transmitted to the distributor 13 is processed in step 414. The processed information is transmitted to the call distributor 13 in step 415.

If, on the other hand, step 402 determines that the voice mailing service is for an existing registered (i.e., a previously registered) mail number, one of the voice mailing units 12 receives and verifies the mail number in step 403. The mail number received is checked against the internal database of voice mailing unit 12 in order to determine whether the received mail number is already registered within the internal database of voice mailing unit 12 in step 404. If the received mail number is already registered in the internal database, the call process is performed for providing voice mailing service in order to set up the call process in step 408. If however, step 404 determines the received mail number is not registered in the internal database, the voice mailing unit number corresponding to the received mail number is designated by server 14 in step 405. At this time, after step 501 is performed, server 14 receives and analyzes the mail number in step 504, and in step 505 extracts information, that is, the mail number, the voice mailing number unit number and the identifier, which are associated with the corresponding mail number, from the database of memory 16 for the server 14. If server 14 transmits the extracted information to a designated one of the voice mailing units 12 in step 506, that voice mailing unit 12 receives the transmitted information, and then checks the mail number, the voice mailing unit number and the identifier in step 406. If the internal call is recovered and the transmitted information is processed in step 407, or if the call process set-up is completed in step 408, information is transmitted to call distributor 13 in step 415. Then, call distributor 13 in step 308 performs a general mailing function in the case that information received from voice mailing unit 12 is determined to be normal in step 304. If the call from the service user has been interrupted in step 304 by a time-out, the process for recovering the call is performed in step 309. If step 304 determines that the received information is abnormal, the received information is reconstructed in step 305 in order to determine the voice mailing unit number to be established. In step 306 a call connection to the corresponding voice mailing unit 12 is separately achieved on the basis of the received information, so that the mail number and the identifier are retransmitted to the designated one of the voice mailing units 12. If during the process of step 307, the received information is recovered sufficiently by reconstruction, the initially established call connection is restored and the call connection between the service subscriber and the corresponding one of voice mailing units 12 is reinstated. When the call connection is completed, call distributor 13 transmits a service starting signal to mail gateway 11 to initiate the voice mailing service function. Call distributor 13 waits until the call is recovered in step 308, while continuously maintaining the availability of the voice mailing service function for the service user who initiated the call. When the voice mailing service is completed, call distributor 13 performs the process for recovering the call in step 309.

As discussed above, the voice mailing service apparatus practiced according to the present invention advantageously provides direct registration of the mail number by the service user as a technique for designating the new mail number of the service user, thereby providing a system able to accommodate many service subscribers. While there have been illustrated and described what are considered to be preferred embodiments of the present invention, it will be understood by those skilled in the art that various changes and modifications may be made, and equivalents may be substituted for elements thereof without departing from the true scope of the present invention.

What is claimed is:

1. A voice mail service apparatus, comprising:
    a telephone exchange station for analyzing a concerned mail number and for performing a call connection when a voice mailing service is requested;
    a mail gateway for verifying said mail number which is analyzed in said telephone exchange station;
    a call distributor for analyzing at least one digit of said mail number which is verified in said mail gateway and inputted thereto, thereby to sequentially distribute respective incoming calls to corresponding ones of a plurality of voice mailing units; and
    a server for checking whether said mail number is newly registered, thereby to transmit registered information to said plurality of voice mailing units, said server being connected to said plurality of voice mailing units, wherein said mail number is directly registered by a service user as in the manner of designating said mail number of said service user, thereby to hold mail numbers of many service subscribers in said voice mail service apparatus.

2. A process for controlling a voice mail service apparatus, comprising a telephone exchange station for analyzing a concerned mail number and for performing a call connection when a voice mailing service is requested; a mail gateway for verifying said mail number which is analyzed in said telephone exchange station; a call distributor for analyzing at least one digit of said mail number which is verified in said mail gateway and inputted thereto, thereby to sequentially distribute respective incoming calls to corresponding ones of a plurality of voice mailing units; and a server for checking whether said mail number is newly registered, thereby to transmit registered information to said plurality of voice mailing units, said server being connected to said plurality of voice mailing units; said method comprising the steps of:
    processing an incoming call when a service user inputs a service code through a telephone, thereby to call a concerned voice mailing unit;
    analyzing at least one digit of said inputted service code, thereby to process a call connection to the concerned voice mailing unit;
    transmitting a voice guide message by said concerned voice mailing unit, and then receiving a new mail number inputted by said service user when a new registration code is inputted;
    transmitting said received new mail number to said server, and requesting to newly register said received new mail number to said server;
    registering said new mail number to a database of said server and designating a voice mailing unit number when it is checked that said new mail number is not registered to said server by searching said database of said server;
    transmitting and newly registering said mail number, a voice mailing unit number and an identifier to said designated voice mailing unit number; and receiving said mail number, said voice mailing unit number and said identifier in said voice mailing unit, and registering said mail number, said voice mailing unit number and said identifier to an internal database of said voice mailing unit when it is checked that said voice mailing unit number is consistent with the number of said voice mailing unit, itself.

3. A process for controlling a voice mailing service apparatus, comprising a telephone exchange station for analyzing a concerned mail number and for performing a call connections when a voice mailing service is requested; a mail gateway for verifying said mail number which is analyzed in said telephone exchange station; a call distributor for analyzing at least one digit of said mail number which is verified in said mail gateway and inputted thereto, thereby to sequentially distribute respective incoming calls to corresponding ones of a plurality of voice mailing units; and a server for checking whether said mail number is newly registered, thereby to transmit registered information to said plurality of voice mailing units, said server being connected to said plurality of voice mailing units; said method comprising the steps of:

processing an incoming call when a service user inputs a service code through a telephone, thereby to call a concerned voice mailing unit;

analyzing at least one digit of said inputted service code, thereby to process a call connection to the concerned voice mailing unit;

transmitting a voice guide message by said concerned voice mailing unit, and then receiving a new mail number inputted by said service user when a new registration code is inputted;

checking whether concerned service data corresponding to said received mail number is registered;

if said service data is registered, transmitting said mail number to said call distributor and performing said voice mailing service so that said call process for starting said voice mailing service is achieved;

if said service data is not registered, transmitting a voice mailing unit number corresponding to said mail number to said server, thereby to identify said voice mailing unit number;

receiving said voice mailing unit number in said server, thereby to extract and transmit to said voice mailing unit a mail number, a voice mailing unit number and an identifier corresponding to said mail number;

receiving and checking information corresponding to said mail number, said voice mailing unit number and said identifier from said server, restoring the incoming call from the service user if it has been disconnected, and transmitting information corresponding to said mail number, said voice mailing unit number and said identifier to the service user; and receiving said mail number in said call distributor to thereby again connect the concerned voice mailing unit with a call, transmitting a service starting signal to said mail gateway, and then performing said voice mailing service.

4. A voice mail system, comprising:

a telephone exchange system providing analysis of mail numbers and making operational connections with a plurality of telephone subscribers in dependence upon said analysis of said mail numbers;

means for operationally connecting said telephone exchange system to receive telephone calls from the plurality of telephone subscribers;

means for verifying said mail numbers; and means for making an analysis of at least one digit of said verified numbers and, on a basis of said analysis of said at least one digit, for sequentially distributing said telephone calls to selected ones of a plurality of voice mailing units;

said system further comprising serving means separately connected to each of the plurality of voice mailing units for determining whether said mail numbers are newly registered, and for transmitting information about registration of said mail numbers to the plurality of voice mailing units.

5. A voice mail service apparatus, comprising:

telephone exchange means for analyzing a given mail number and for performing a call connection when a voice mailing service is requested;

mail gateway means for verifying said mail number which is analyzed in said telephone exchange means;

call distributor means for analyzing at least one digit of said mail number verified in said mail gateway means and inputted thereto, whereby to sequentially distribute respective incoming calls to corresponding ones of a plurality of voice mail units; and server means connected to said plurality of voice mailing units for checking whether said mail number is newly registered, whereby to transmit registered information to said plurality of voice mailing units;

wherein said mail number is directly registered by a service user as in the manner of designating said mail number of said service user, whereby to hold mail numbers of a plurality of service subscribers in said voice mail service apparatus.

6. A process for controlling a voice mail service apparatus which includes a telephone exchange service station, a server, and a plurality of voice mailing units connected between said telephone exchange station and said server, said method comprising the steps of:

processing an incoming call when a service user inputs a service code through a telephone, whereby to call a concerned voice mailing unit;

analyzing at least one digit of said inputted service code, whereby to process a call connection to the concerned voice mailing unit;

transmitting a voice guide message by said concerned voice mailing unit, and then receiving a new mail number inputted by said service user when a new registration code is inputted;

transmitting said received new mail number to said server, and requesting new registration of said received new mail number to said server;

determining whether said new mail number is not registered to said server by searching a data base of said server;

when it is determined that said new mail number is not registered to said server, registering said new mail number to said data base of said server and designating a voice mailing unit number;

transmitting said mail number, a voice mailing unit number and an identifier to said designated voice mailing unit number so as to newly register said mail number, said voice mailing unit number and said identifier;

determining whether said voice mailing unit number is consistent with the number of said voice mailing unit; and when it is determined that said voice mailing unit is consistent with the number of said voice mailing unit, receiving said mail number, said voice mailing unit, and said identifier in said voice mailing unit, and registering said mail number, said voice mailing unit number and said identifier to an internal data base of said voice mailing unit.

7. A process for controlling a voice mailing service apparatus, comprising a telephone exchange station, a server, and a plurality of voice mailing units connected between said telephone exchange station and said server, said method comprising the steps of:

processing an incoming call when a service user inputs a service code through a telephone, whereby to call a concerned voice mailing unit;

analyzing at least one digit of said inputted service code, whereby to process a call connection to the concerned voice mailing unit;

transmitting a voice guide message by said concerned voice mailing unit, and then receiving a new mail number inputted by said service user when a new registration code is inputted;

determining whether concerned service data corresponding to said received mail number are registered;

if said concerned service data are registered, transmitting said mail number and performing said voice mailing service so that the call process for starting said voice mailing service is achieved;

if said concerned service data is not registered, transmitting a voice mailing unit number corresponding to said mail number to said server, whereby to identify said voice mailing unit number;

receiving said voice mailing unit number in said server, whereby to extract and transmit to said voice mailing unit a mail number, a voice mailing unit number and an identifier corresponding to said mail number;

receiving and checking information corresponding to said mail number, said voice mailing unit number and said identifier from said server, restoring the incoming call from the service user if it has been disconnected, and transmitting information corresponding to said mail number, said voice mailing unit number and said identifier to the service user; and receiving said mail number, whereby to again connect the concerned voice mailing unit with a call, transmitting a service starting signal, and then performing said voice mailing service.

8. The method of claim 7, wherein said voice mailing service apparatus includes a call distributor connected between said telephone exchange station and said plurality of voice mailing units, and wherein said step of receiving said mail number comprises receiving said mail number in said call distributor.

9. The method of claim 7, wherein said voice mailing service apparatus includes a mail gateway connected between said telephone exchange station and said plurality of voice mailing units, and wherein said step of transmitting said service starting signal comprises transmitting said service starting signal to said mail gateway.

10. A voice mail system, comprising:

telephone exchange means for providing analysis of mail numbers and for making operational connections to a plurality of telephone subscribers in dependence upon said analysis of said mail numbers;

connecting means for connecting said telephone exchange means to receive telephone calls from the plurality of telephone subscribers;

verifying means for verifying said mail numbers;

analyzing means for analyzing at least one digit of said verified numbers and, on a basis of said analysis of said at least one digit, for sequentially distributing said telephone calls to selected ones of a plurality of voice mailing units; and serving means separately connected to each of said plurality of voice mailing units for determining whether said mail numbers are newly registered, and for transmitting information relative to registration of said mail numbers to said plurality of voice mailing units.

* * * * *